United States Patent
Jones

(10) Patent No.: US 11,317,760 B2
(45) Date of Patent: May 3, 2022

(54) TWO-SIDED COOKING DEVICE WITH UPPER PLATEN POSITION LOCKING MECHANISM FOR HIGH COMPRESSION PRECISION POSITIONING CONTROLLED COOKING

(71) Applicant: GARLAND COMMERCIAL INDUSTRIES, LLC, New Port Richey, FL (US)

(72) Inventor: Douglas S. Jones, New Port Richey, FL (US)

(73) Assignee: GARLAND COMMERCIAL INDUSTRIES, LLC, New Port Richey, FL (US)

( * ) Notice: Subject to any disclaimer, the term of this patent is extended or adjusted under 35 U.S.C. 154(b) by 769 days.

(21) Appl. No.: 16/102,065

(22) Filed: Aug. 13, 2018

(65) Prior Publication Data

US 2019/0231124 A1    Aug. 1, 2019

Related U.S. Application Data

(60) Provisional application No. 62/625,282, filed on Feb. 1, 2018.

(51) Int. Cl.
*A47J 37/06* (2006.01)
(52) U.S. Cl.
CPC .... *A47J 37/0611* (2013.01); *A47J 2037/0617* (2013.01)
(58) Field of Classification Search
CPC ............. A47J 37/0611; A47J 2037/0617
See application file for complete search history.

(56) References Cited

U.S. PATENT DOCUMENTS 5,247,874 A * 9/1993 George, II ........... A47J 37/0611
                                                      100/319
5,341,727 A    8/1994 Dickson
(Continued)

FOREIGN PATENT DOCUMENTS

EP    3745933 A1    12/2020
JP    H04197321 A    7/1992
(Continued)

OTHER PUBLICATIONS

International Preliminary Report on Patentability (IPRP) dated Apr. 21, 2020 for PCT application No. PCT/US2018/46469.
(Continued)

*Primary Examiner* — Dana Ross
*Assistant Examiner* — Kuangyue Chen
(74) *Attorney, Agent, or Firm* — Ohlandt, Greeley, Ruggiero and Perle, LLP

(57) ABSTRACT

The present disclosure provides a grill having a movable upper platen and a lower platen, the latter of which holds food products that are cooked by between the platens. The upper platen has a platen arm, locking drive, and locking pin connected thereto. An actuator, drive shaft, and drive shaft head are operably connected to the platen arm. During operation of the grill, the locking drive drives the locking pin into the drive shaft head, holding the upper platen parallel to the lower platen, even when greater downward pressure is applied by the actuator than the weight of the upper platen. In prior art devices, applying this kind of pressure would cause the upper platen to become nonparallel to the lower platen, causing uneven cooking. Locking the upper platen horizontally ensures that the upper platen will not go out of horizontal level when it comes into contact with food products on the lower platen.

17 Claims, 20 Drawing Sheets

(56) References Cited

U.S. PATENT DOCUMENTS

| | | | |
|---|---|---|---|
| 6,079,321 A * | 6/2000 | Harter | A47J 37/0611 |
| | | | 99/349 |
| 8,555,777 B2 | 10/2013 | Calzada et al. | |
| 2014/0026764 A1 | 1/2014 | Sykes et al. | |
| 2014/0036764 A1 | 1/2014 | Sykes et al. | |
| 2015/0305554 A1 | 10/2015 | Dorsten et al. | |
| 2019/0231124 A1 | 8/2019 | Jones | |

FOREIGN PATENT DOCUMENTS

| | | |
|---|---|---|
| JP | H119466 A | 1/1999 |
| JP | 2009509714 A | 3/2009 |
| JP | 2015535639 A | 12/2015 |
| WO | 2019152071 A1 | 8/2019 |

OTHER PUBLICATIONS

International Search Report dated Oct. 29, 2018 for PCT application No. PCT/US2018/046469.
Written Opinion dated Oct. 29, 2018 for PCT application No. PCT/US2018/046469.
Japanese Office Action dated Sep. 14, 2021 for Japanese Patent Appt. No. 2020-532818.
European Search Report dated Sep. 15, 2021 for European Patent Appl. No. 18904319.3.
Canadian Office Action dated Dec. 7, 2021 for Canadian Patent Appl. No. 3,075,929.
Canadian Office Action dated Apr. 23, 2021 for Canadian Appl. No. 3075929.

* cited by examiner

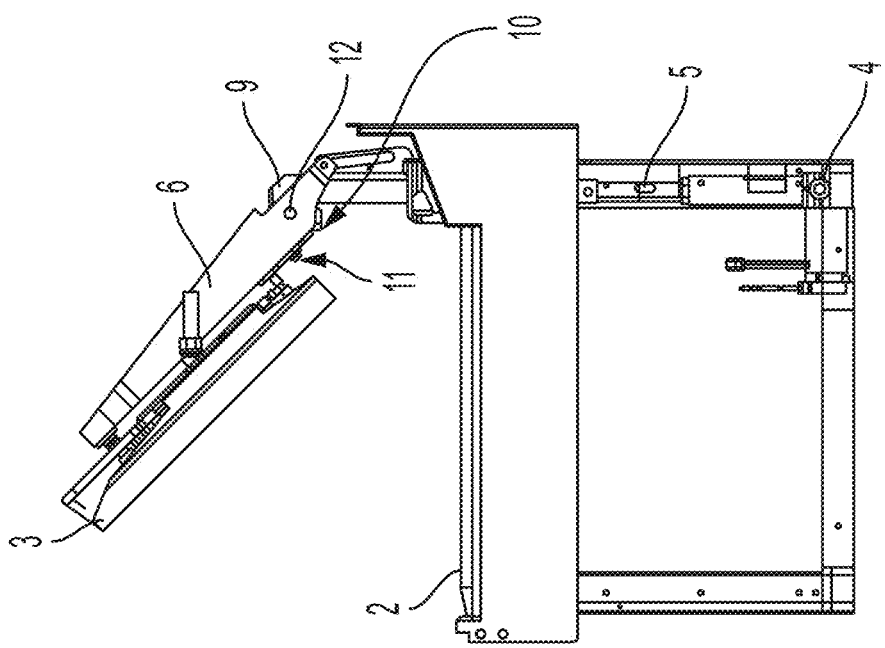
FIG. 9

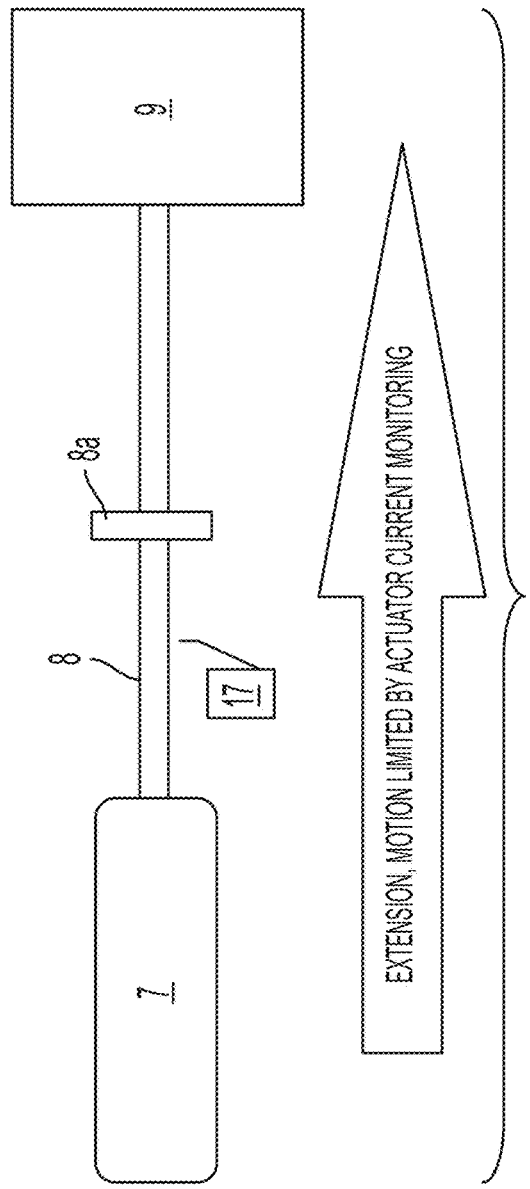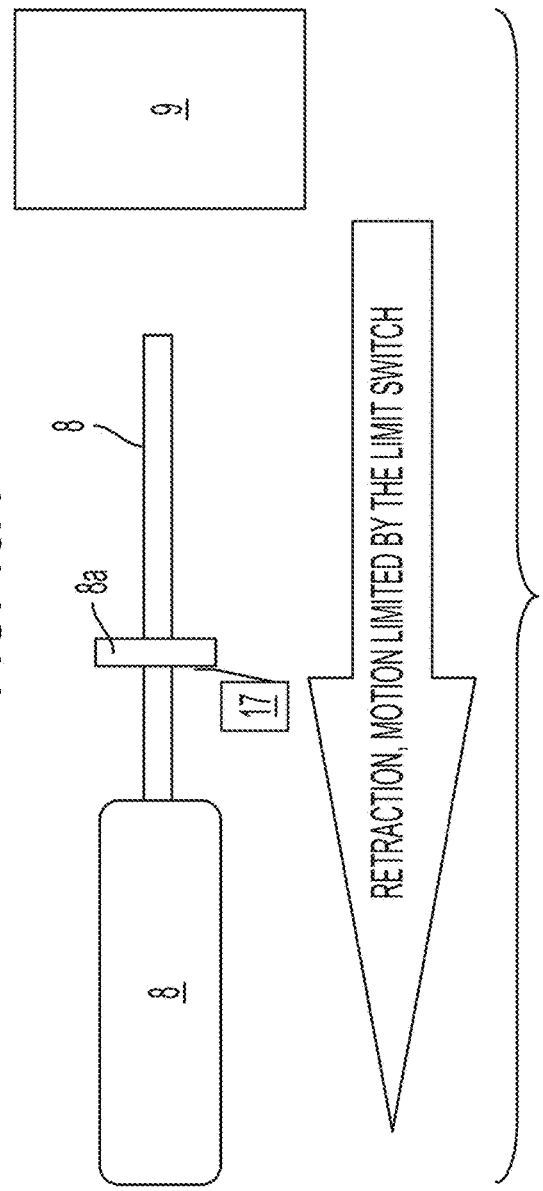

TWO-SIDED COOKING DEVICE WITH UPPER PLATEN POSITION LOCKING MECHANISM FOR HIGH COMPRESSION PRECISION POSITIONING CONTROLLED COOKING

CROSS-REFERENCE TO RELATED APPLICATION

The present application claims the benefit of U.S. Provisional Patent Application Ser. No. 62/625,282, filed on Feb. 1, 2018, which is herein incorporated by reference.

BACKGROUND OF THE DISCLOSURE

1. Field of the Disclosure

The present disclosure relates to devices and methods for controlling platen positioning in cooking grills. More particularly, the present disclosure provides devices and methods for preventing the two-stage upper platen of a two-sided cooking device with a rear pivotable upper platen from rotating when in the horizontal cooking position. This ensures that the precision upper plate positioning mechanism can apply greater pressure on the food positioned on the lower platen than the weight of the platen alone, and without being forced to pivot out of a parallel position relative to the lower platen due to food products or other objects on the lower platen.

2. Description of the Related Art

Two-sided cooking devices or grills, as described in U.S. Pat. No. 5,934,182, have a mechanism or platen that is lowered to and cooks in the horizontal position, parallel to a lower cooking surface. When in the non-cooking position, the upper platen is raised and pivots from a point behind the cooking surfaces to a position that exposes the upper cooking surface to the operator so that the upper surface can be accessed for cleaning and is out of the way for removing the cooked food from the lower surface. Because of the design of the upper platen positioning drive system, the upper platen is pivotable at a rear pivot point, from a horizontal cooking position an angled upper non-cooking position.

When the upper platen is lowered, it rotates from an angled, upper, non-cooking position to a horizontal parallel position at an upper-most cooking position. Here, the rotational motion of the platen is stopped by contacting a stop. The weight of the upper platen maintains the contact between the platen and the stop. This keeps the platen horizontal as long as the force of the food on the lower plate is less than the weight of the upper platen.

If the platen positioning drive system tried to apply more pressure than the weight of the upper platen onto the food placed on the lower platen, the rear pivot point lowers to a point at which the upper platen will start to pivot, around the furthest back point of contact that the upper platen has on the food or the lower grill plate. When this happens the front of the upper platen pivots upward, making the upper platen non-parallel with the lower platen and the food product. This causes uneven cooking, and possibly unsafe food quality, due to undercooked food in the front cooking area. So, current configurations of two-sided grills, for example that described in U.S. Pat. No. 5,934,182, cannot cook foods that require more pressure to compress food product with more pressure than the physical weight of the upper platen and maintain parallelism between the upper and lower cooking platen surfaces.

In some applications, the customer wants to use more pressure to compress or form soft (unfrozen) food products with more compressive force than the physical weight of the upper plate and maintain parallelism between the upper and lower cooking surfaces. There is a need for a device that achieves these objectives and addresses the above-described problems of current devices.

SUMMARY OF THE DISCLOSURE

The grill of the present disclosure comprises an upper platen, a lower platen on which food product is placed, and a liner positioning system that controls the height of the upper platen with respect to the lower platen. The grill of the present disclosure can apply much more pressure to the lower platen and food product than currently available devices. In current devices, there is a limit to how much pressure can be applied, since they can only rely on gravity and the weight of the upper platen to maintain parallelism. One way to achieve this is with a locking pin on the upper platen that holds the upper platen parallel to the lower platen, when the upper platen is in the horizontal cooking position.

Thus, in one embodiment, the present disclosure provides a grill for cooking food products. The grill comprises: an upper platen, a lower platen, wherein the food products are placed on the lower platen, a drive shaft having a drive shaft head, wherein the drive shaft and drive shaft head are operably connected to the upper platen; an actuator operably connected to the drive shaft, wherein the actuator selectively retracts and extends the drive shaft, in order to control a vertical height of the upper platen with respect to the lower platen; and a locking mechanism operably connected to the upper platen, wherein the locking mechanism locks the upper platen in a horizontal position that is parallel to the lower platen.

In one embodiment, the locking mechanism comprises a drive mechanism connected to the upper platen and a locking pin operably connected to the drive mechanism. The drive mechanism selectively extends and retracts the locking pin. In an extended position, the locking pin contacts the drive shaft head to lock the upper platen in the horizontal position.

In another embodiment, the present disclosure provides a method of cooking a food product with the grill. The method comprises the steps of: placing the food product on the lower platen; controlling the actuator to lower the upper platen to a horizontal position that is parallel to the lower platen; controlling the actuator to move the upper platen toward the lower platen, when the upper platen is in the horizontal position; and controlling the upper platen to stay in the horizontal position after the upper platen contacts the food product.

In another embodiment, the present disclosure provides a method of deforming a food product with the grill. The method comprises the steps of: placing the food product on the lower platen; controlling the actuator to lower the upper platen to a horizontal position that is parallel to the lower platen; controlling the actuator to move the upper platen toward the lower platen, while the upper platen is in the horizontal position, thereby compressing the food product; controlling the upper platen to stay in the horizontal position after the upper platen contacts the food product; compressing the food product so that a thickness of the product after the compressing step is smaller than a thickness of the food product before the compressing step; and cooking the food product between the lower platen and the upper platen.

In another embodiment, the present disclosed provides a method of deforming a food product using the above-described grill. The food product is deformed between the upper and lower platens according to programmed steps of compressing and relieving the pressure on the food between the platens to achieve a desired food quality.

DESCRIPTION OF THE DRAWINGS

FIG. 9 is a side view of the grill of FIG. 1, with the upper platen in a raised and tilted position;

FIGS. 19a and 19b show a schematic drawing of a control mechanism for extending and retracting the locking pin of the present disclosure.

DETAILED DESCRIPTION OF THE DISCLOSURE

Figure 1:
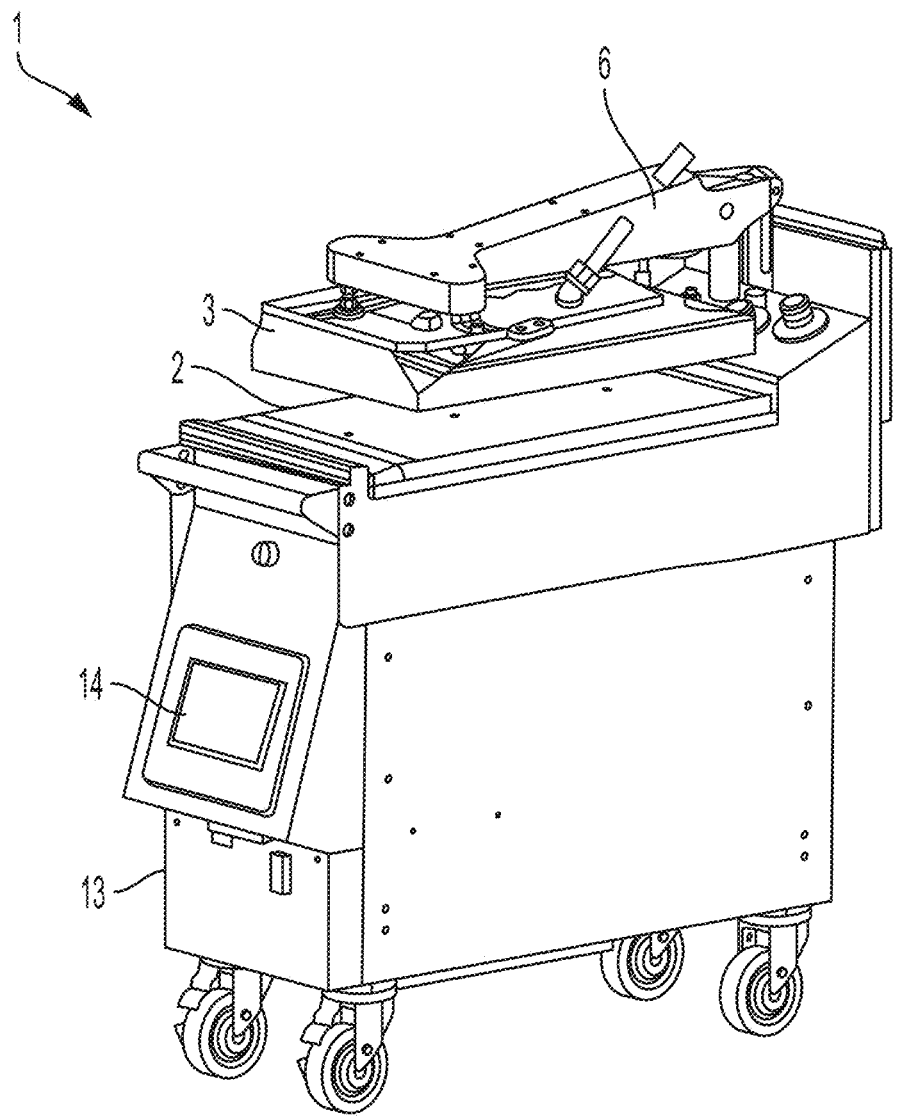
FIG. 1 is a front, perspective view of the grill of the present disclosure.
Figure 2:
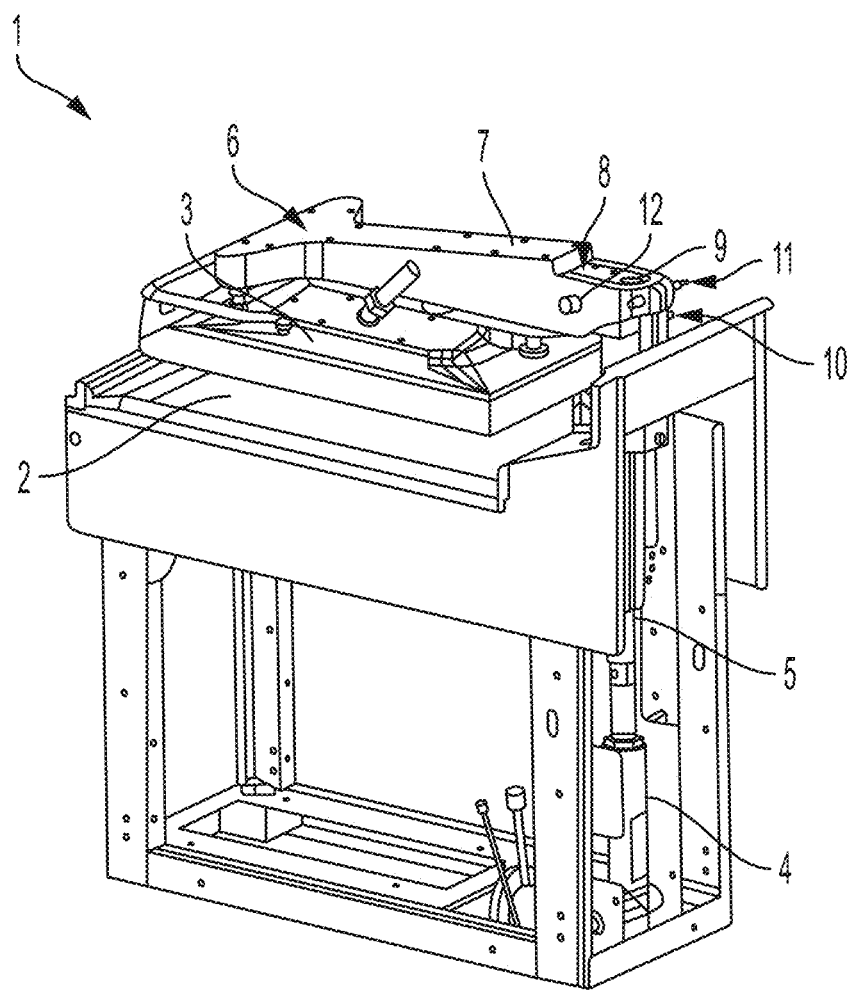
FIG. 2 is a rear, perspective view of the grill of FIG. 1.

The present disclosure provides clamshell grill devices and methods that allow for cooking which requires more force than the physical weight of the upper platen. The cooking cycle of the present disclosure can be completed automatically, controllably, and with repeatability. The grill of the present disclosure provides ways to stop the upper platen of a clamshell grill from pivoting when the rear precision positioning drive applies a downward force on the upper platen. This can be useful, as one example, when it is needed to deform a food product to a height that is less that the height of the food product when it is placed on the lower platen. The devices of the present disclosure provide a way to controllably and selectively lock the upper platen parallel to the lower cooking surface when in the cooking position, and unlock the platen to allow rotational motion to the upper non-cooking position. Locking the upper platen in a horizontal position with respect to the lower platen allows for the cooking of multiple food products on a lower platen surface, at a high pressure, and all to the same specifications. Current grills do not have the capability to deform and cook food products to a desired consistency, automatically and with repeatability. The grill of the present disclosure can be operated in modes where the locking mechanism is employed, and where it is not employed.

Referring to the Figures, and in particular FIGS. 1-12, grill 1 of the present disclosure is shown. Grill 1 has lower platen 2, upper platen 3, linear actuator 4, and drive shaft 5. Upper platen 3, actuator 4, and drive shaft 5 are connected to one another in the manner described in further detail below, so that actuator 4 can control and adjust a height of upper platen 3 with respect to lower platen 2. Importantly, grill 1 also has platen arm 6, with locking drive 7 and locking pin 8 connected thereto. Platen arm 6, locking drive 7, and locking pin 8 are all connected to an upper surface of upper platen 3. Drive shaft 5 has a drive shaft head 9 at the top thereof.

In one embodiment, upper platen 3 and platen arm 6 are one, unitary component. This can mitigate any looseness in connections, which can lead to a shaking or wobbling of upper platen 3.

When grill 1 is in use, a controller 13 can control locking drive 7 to drive pin 8 so that it contacts or engages with drive shaft head 9. Locking pin 8 can be driven in a horizontal or primarily horizontal direction. Drive pin 8 contacts a front surface of drive shaft head 9 in a location that pushes platen arm 6 solidly onto the drive shaft head 9, above the platen pivot point 12 (discussed in greater detail below). This prevents platen arm 6 from pivoting.

Locking drive 7 can include any number of ways to drive locking pin 8, such as a gear motor, stepper motor, or a solenoid. Locking drive 7 can also comprise a spring, so that it is constantly forcing locking pin 8 against shaft head 9. The end of locking pin 8 can follow the contour of shaft head 9. When upper platen 3 is horizontal, there can be a break or magnet in the surface of shaft head 9, that engages locking pin 8. Locking pin 8 also may have cushions or padding at either end, to reduce wear and tear.

When locking pin 8 is engaged with drive shaft head 9 in this manner, it significantly or completely prevents upper platen 3 from rotating with respect to drive shaft head 9 and drive shaft 5. When this is the case, controller 13 controls actuator 4 to move upper platen 3 so that it applies a much greater force on food products that are on lower platen 2 than would otherwise be possible, all while upper platen 3 maintains a horizontal position. Controller can control upper platen 3 to move to a set programmed vertical position or positions during the cooking program.

As previously discussed, when upper platen 3 is not locked in place, the most force that can be applied to the food products, and still maintain a level horizontal position, is the weight of the platen. Without a locking mechanism in place, if actuator 4 were to apply more force to platen 3, platen 3 would rotate at a rear pivot point, going out of level with respect to lower platen 2, and cook the food products unevenly. At the end of a cooking program, when upper platen 3 is raised to an upper most horizontal cooking position, locking pin 8 is retracted, allowing rotational motion of upper platen 3 to its noncooking position.

Upper platen 3 moves as it is lowered from a non-cooking position (FIGS. 7-9) to a horizontal cooking position (FIG. 1 et al). In the uppermost non-cooking position, upper platen 3 is at an angle greater that horizontal with respect to lower platen 2, to allow access to the cooking surfaces of lower platen 2 and upper platen 3. In order to move to a cooking position, the actuator 4 retracts drive shaft 5, which is located behind the cooking surfaces. Drive shaft head 9, which as previously discussed is connected to shaft 5, has a pivot stop 10 located on the front lower edge of head 9. As the actuator 4 retracts, upper platen 3 rotates downward to a horizontal position. Upper platen 3 can have a positioning stop 11 that contacts pivot stop 10 on head 9 when upper platen 3 is in a horizontal position. Upper platen arm 6 can be connected to drive shaft head 9 in such a way that platen arm 6 (and thus upper platen 3) can rotate about pivot point 12 on head 9.

There may also be a switch or trigger elsewhere on grill 1 that indicates when upper platen 3 is rotating downward into the cooking position. This switch could send a signal to controller 13, which in turn would start the extension of locking pin 8, before upper platen 3 is fully horizontal. This could save some time in the cooking process.

Once upper platen 3 has rotated to horizontal and is parallel to lower platen 2, this is the point in the rotation of upper platen 3 that pivot stop 10 and positioning stop 11 make contact. This stops the rotation of upper platen arm 6 at a point where it is horizontal and parallel to lower platen 2. Once stops 10 and 11 are in contact with each other, the area distance between the bottom of the upper platen 3 and the cooking surface of lower platen 2 is the zone where parallel platen cooking can take place. In some cases, a food product is placed on lower platen 2 that has a height (in a pre-cooked state) that greater than the desired cooked product height. The present disclosure allows for the locking of upper platen arm 6 and upper platen 3, allowing the downward force of the actuator 5 to compress the product to the desired cooked thickness.

When compression of the food product is desired, locking pin 8 can be deployed in the manner described above. As previously discussed, this allows controller 13 to control actuator 4, to in turn adjust the vertical position of upper platen 3, without rotation at pivot point 12. This keeps upper platen 3 parallel to lower platen 2, even when the reaction force of the foods is greater than the force that can be produced by the weight of upper platen 3. Stated another way, the resistance of the food product when pressed by upper platen 3 would force the upper platen to pivot out of parallel, were it not for the locking mechanism (drive 7 and pin 8) of the preset disclosure. When the food product presses upward on upper platen 3, locking pin 8, which is pushing platen arm 6 solidly into positioning stop 11 across pivot point 12, locks platen arm 6 from rotating around pivot point 12. This transfers the vertical pulling force generated by the motor of actuator 4 to pull down on upper platen 3 with greater pressure on the food and while maintaining parallelism between upper platen 2 and lower platen 2. In this way, an equal amount of force can be applied to food products that are at the front and back of the surface of lower platen 2.

A switch or other device (discussed in greater detail below) can detect or determine when upper platen 3 is at a position where the positioning stop 11 has made contact with pivot stop 10, stopping rotation in the horizontal position. Once this point is reached, as described above, controller 13 controls locking drive 7 to move locking pin 8 into place. The materials used for the locking pin, pivot stop, and pivot head should be strong enough to withstand multiple deployments over time. Stainless steel is one non-limiting example of a material strong enough to withstand repeated engagements between pin 8 and shaft head 9.

Once the upper platen is locked in place by locking drive pin 8, actuator 4 can moves upper platen 3 toward lower platen 2 with the full force of the drive system, which is much greater that the weight of upper platen 3 when allowed to naturally pivot without upper platen arm 6 being locked. Actuator 4 can then, via controller 13, control the position of upper platen 3 in a programmed sequence of positions for cooking the food product on the lower platen surface. The programmed sequences can include such variables as the amount of time upper platen 3 is in a certain position, the height of upper platen 3 with respect to upper platen 2, and the amount of pressure applied to upper platen 3 and thus the food products on lower platen 2. Controller 13 can be within the housing of grill 1. A user can select a desired program and initiate cooking through a user interface 14. Once cooking is complete, controller 13 controls locking drive 7 to retract locking pin 8, so that upper platen 3 can rotate upwards again, out of the horizontal cooking position.

In one embodiment, the locking mechanism (drive 7 and pin 8) is a motorized threaded drive assembly located within or slightly above upper platen 6, that drives threaded locking pin 8 (FIG. 4) onto head 9 above pivot 12, forcing platen arm 6 to lock in a horizontal position between the pivot stop 10 below pivot point 12. Locking pin 8 applies pressure to drive head 10 above pivot 12, and forces platen arm 6 into pivot stop 10. This forces upper platen arm 6 horizontal, locking it in place. When pin 8 is engaged upper platen arm 6 becomes rigid and can then be pulled down to a programmed position. The above-described embodiment may be best for precise control and force, but the present disclosure contemplates other locking mechanisms, such as an unthreaded pin 8.

The present disclosure also contemplates the use of other means of preventing the upper platen arm 6 from moving relative to head 9 when in a horizontal cooking orientation, to enable applying a force greater than the weight of the upper platen to the food product. For example, a fastener driven by a motor can be driven from upper platen and through drive shaft head 9 and pivot point 12. This would prevent relative movement between upper platen 3 and drive shaft head 9, and hold upper platen 3 horizontal. Other devices and methods are contemplated, as long as they prevent upper platen 3 from going out of horizontal with respect to lower platen 2 as force is applied.

One of the advantages of the grill of the present disclosure is that the additional force described above can be used to compress and or change the vertical profile of a soft conformable food product between the platens 2, 3. This may be desirable for example to form hamburger patties form fresh ground beef balls placed on lower platen 2. The resulting texture is desirable to some customers. It may have a rougher edge, as opposed to frozen, pre-shaped flat patties with smooth edges.

Grill 1 of the present disclosure can be used in a locking or non-locking mode, allowing the operator great flexibility. Again, the programs for these different modes can be stored on controller 13, and accessed or selected through user interface 14. Program cooking in the locked mode allows the operator to put food on lower platen 1 and compress or re-form the profile of the food to a different shape, then apply different amounts of pressure on the food during the cooking process through available cooking programs. This can be achieved, for example, by moving upper platen 3 to different vertical positions (closer or away) from lower platen 2, thereby applying more or less pressure to the food to cook it to the desired characteristics. For example, the user may desire a program whereby upper platen 3 is applied with a high force for an initial period of time, to deform the food product, and then a lower force, to allow the food product to swell. Locking pin 8 could also be released at a point in the program, to use only the gravity weight of the upper platen to complete the cooking program. All of these options could be programmed into controller 13 and user interface 14, so that they are one-touch from a user's perspective.

Figure 13:
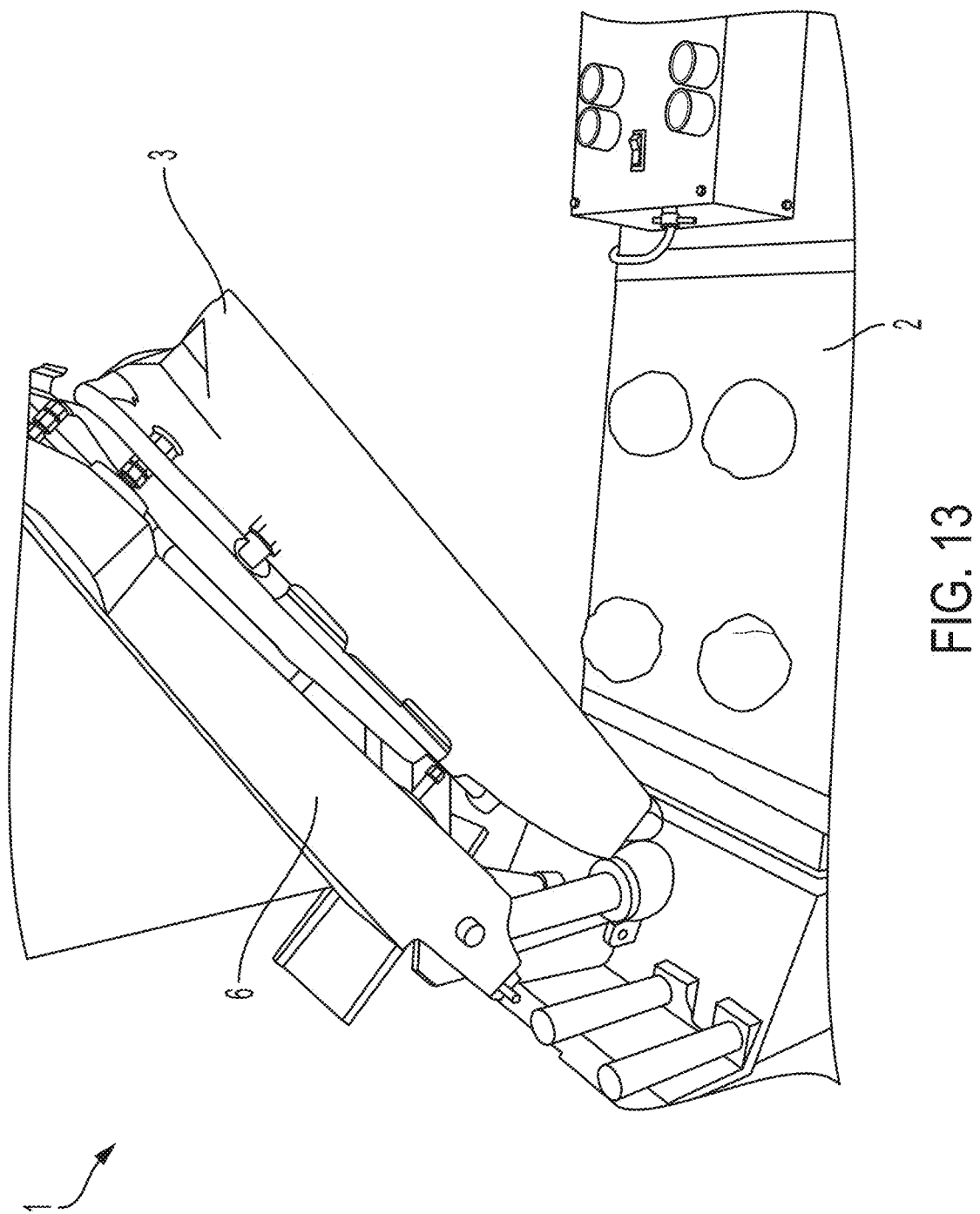
FIG. 13 shows the grill of FIG. 1, with the upper platen raised and tilted, with pre-compressed food products on the lower platen.
Figure 14:
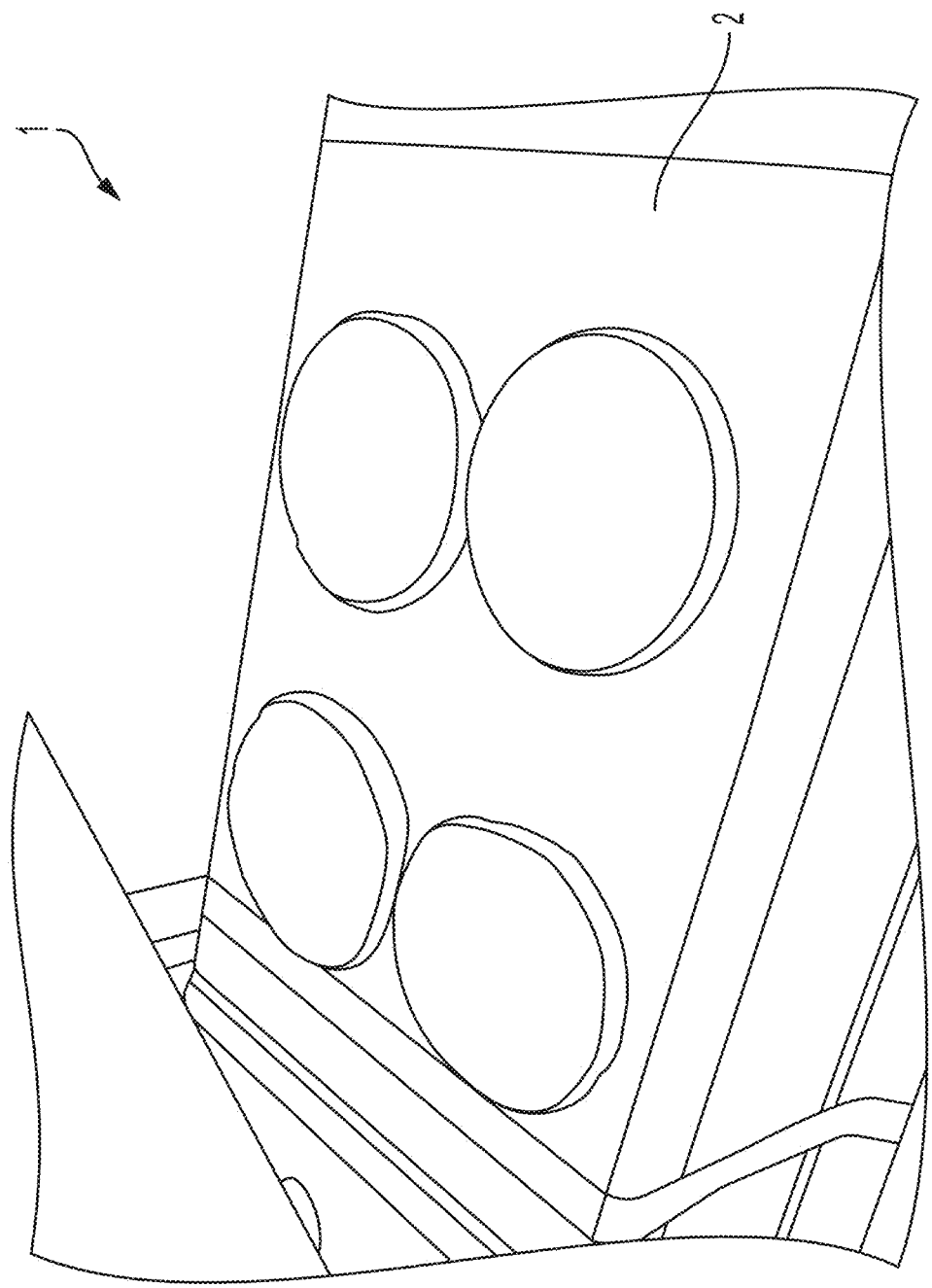
FIG. 14 shows the grill of FIG. 1, with the food products in a compressed state.
Figure 15:
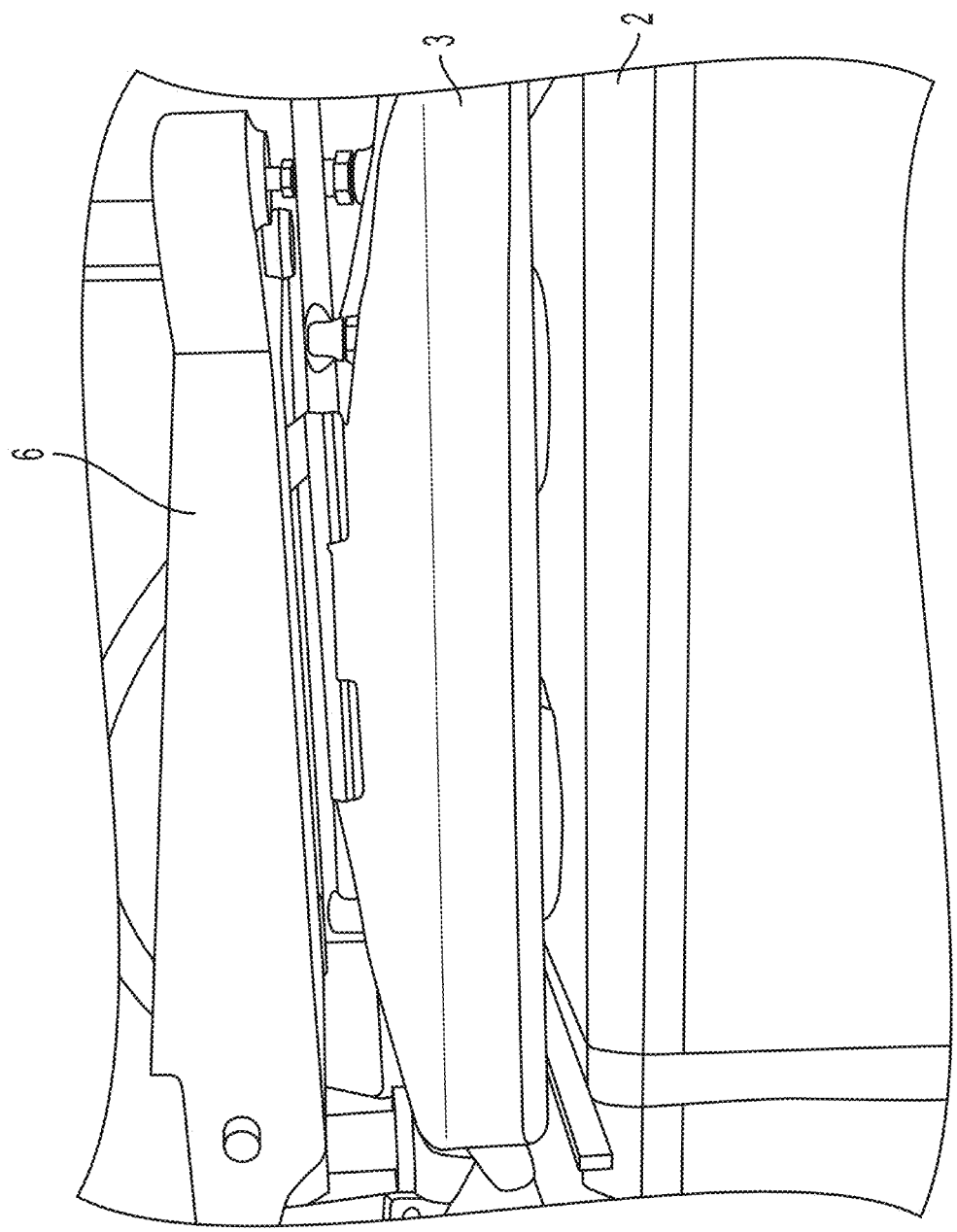
FIG. 15 shows a side view of the grill of FIG. 1, with the upper platen lowered in an unlocked position.
Figure 16:
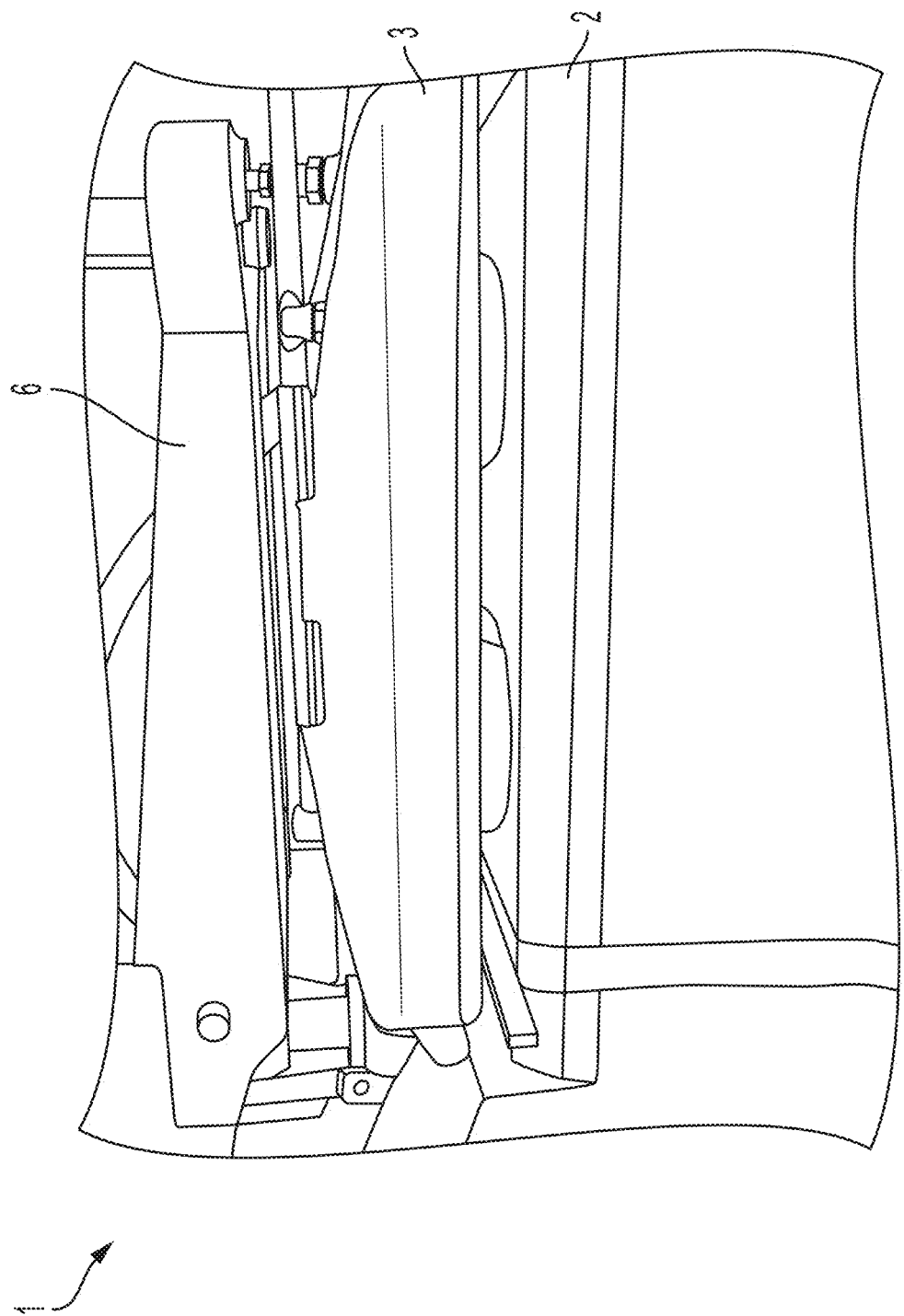
FIG. 16 shows the grill of FIG. 1, with the upper platen lowered in a locked position.
Figure 17:
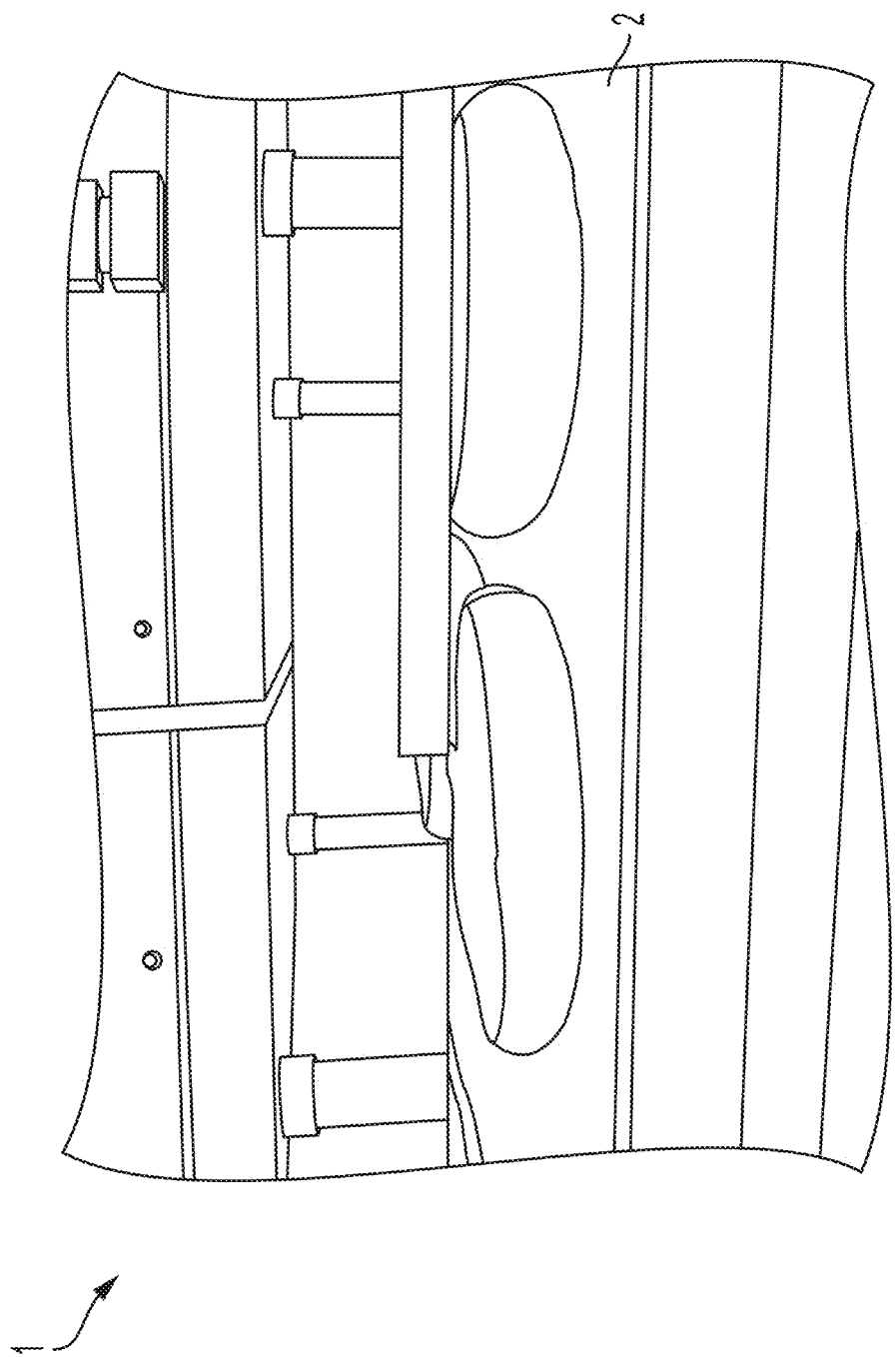
FIG. 17 shows the compressed food products produced by the grill as depicted in FIG. 15, when the locking mechanism is not engaged, and the food products are not compressed to the same thickness.
Figure 18:
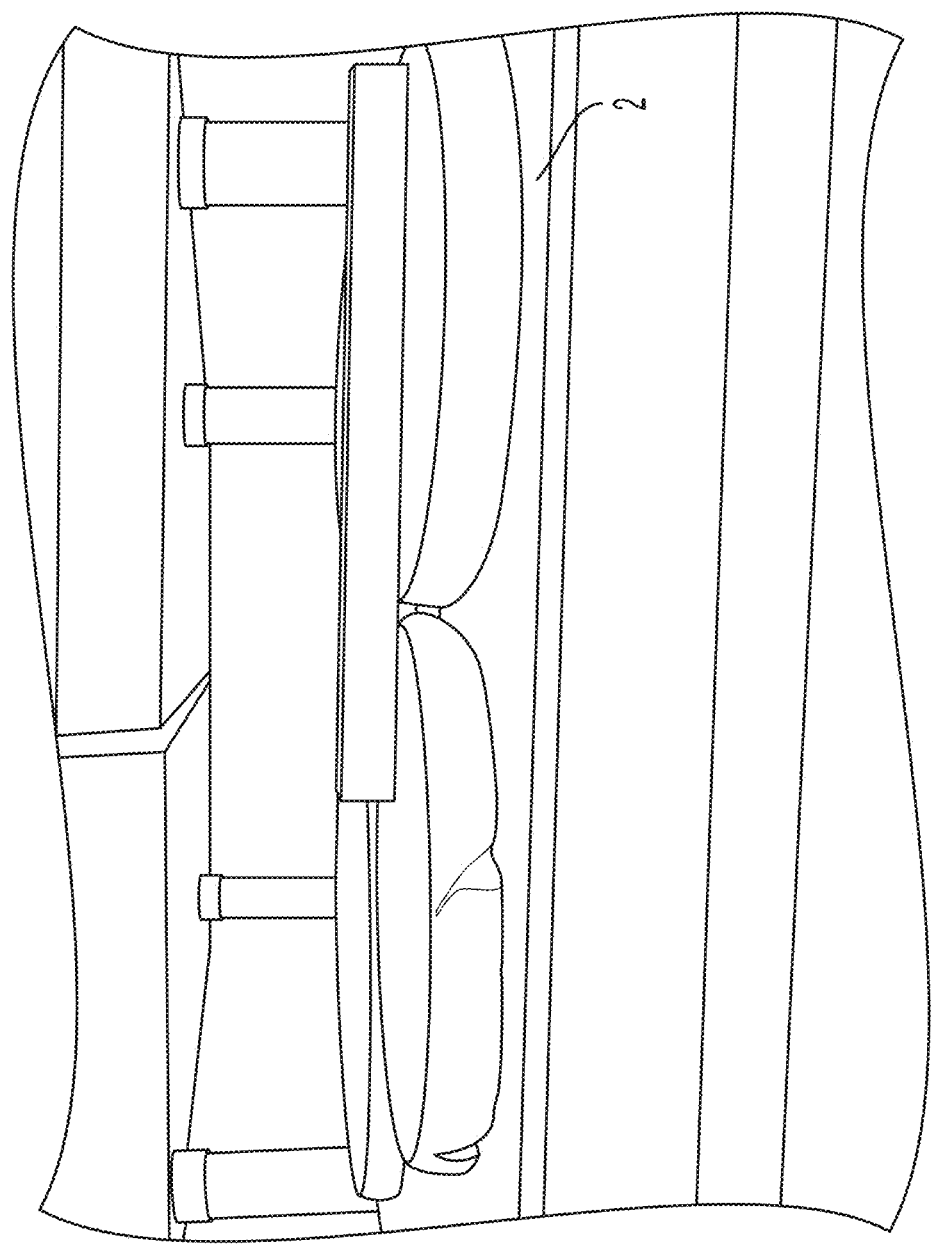
FIG. 18 shows the compressed food products produced by the grill as depicted in FIG. 15 when the locking mechanism is engaged, and the food products are compressed to the same thickness.

Referring to FIGS. 13-18, grill 1 is shown, with examples of food products at various stages. In FIG. 13, food products are on lower platen 2, while upper platen 3 is in a non-cooking position, namely raised. As can be seen, the food products are ball-shaped, meaning that some additional force beyond the weight of upper platen 3 is needed to compress the food products into the flatter, patty shapes in FIG. 14. The grill in FIG. 15 is cooking without a locking pin engaged. As a result, upper platen 3 is out of level, meaning that the food products at the rear of lower platen 2 (to the left side in the figure) are compressed more than the food products at the front of lower platen 2 (to the right of the figure). By contrast, in FIG. 16, a locking pin is used, and upper platen 3 is level, even after compressing the food products on lower platen 2. FIG. 17 shows the effect of not using a locking pin when compressing food products with more force than the weight of upper platen 3. The food products will be cooked at uneven pressures, leading to differences in size and degree of cooking. This is very undesirable in, for example, the fast food industry, where conformity to standards is critical. FIG. 18 shows food products cooked with the locking pin of the present disclosure. As can be seen, even when compressive force is required, the food products at different locations on lower platen 2 are compressed and cooked to the same height, ensuring uniformity of the product.

Figure 3:
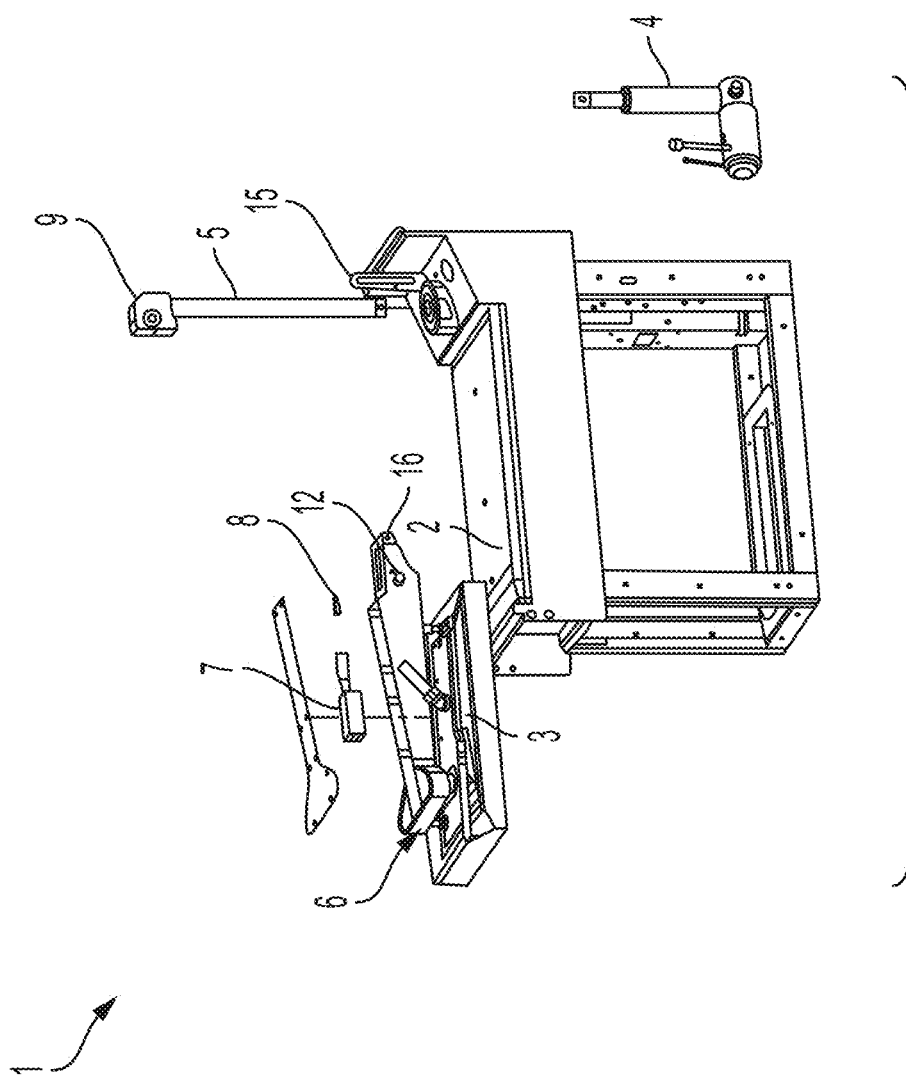
FIG. 3 is an exploded view of the grill of FIG. 1.
Figure 4:
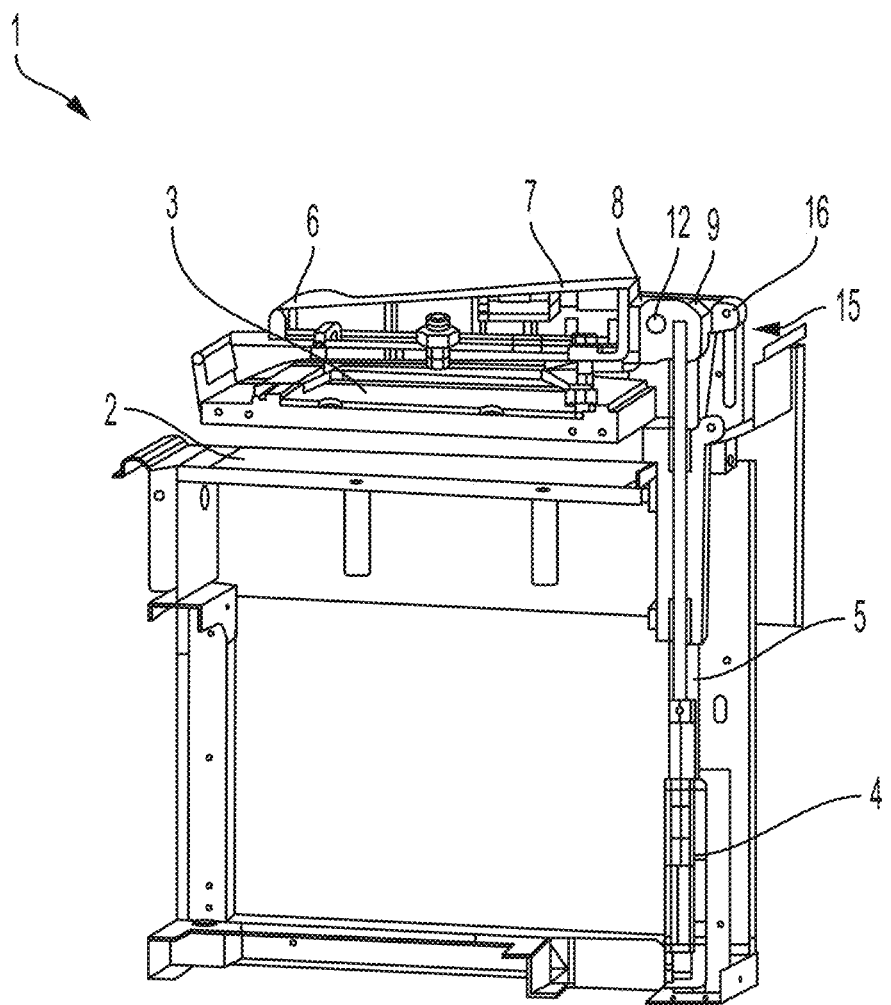
FIG. 4 is a cross-sectional view of the grill of FIG. 1.
Figure 5:
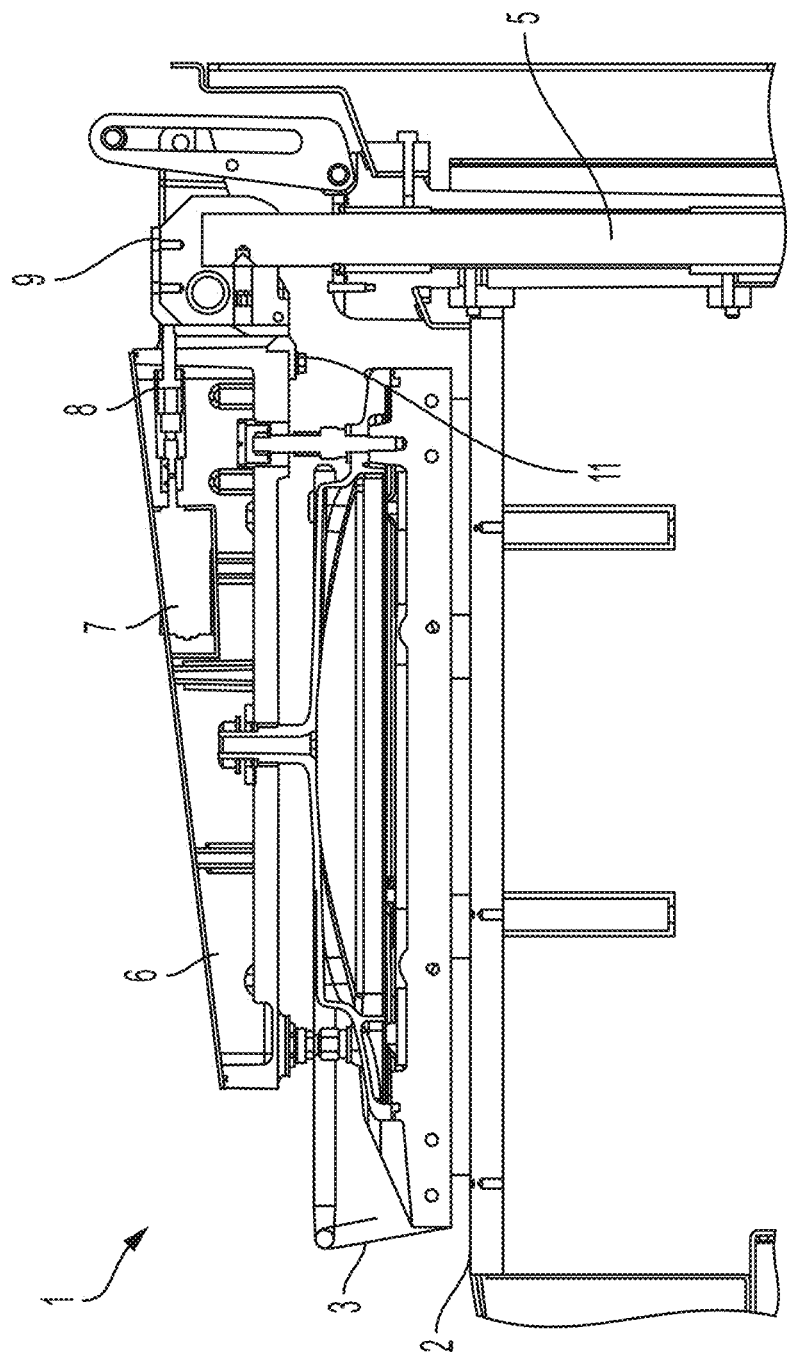
FIG. 5 is a cross-sectional detail of the grill of FIG. 1, with an upper platen in a lowered position.
Figure 6:
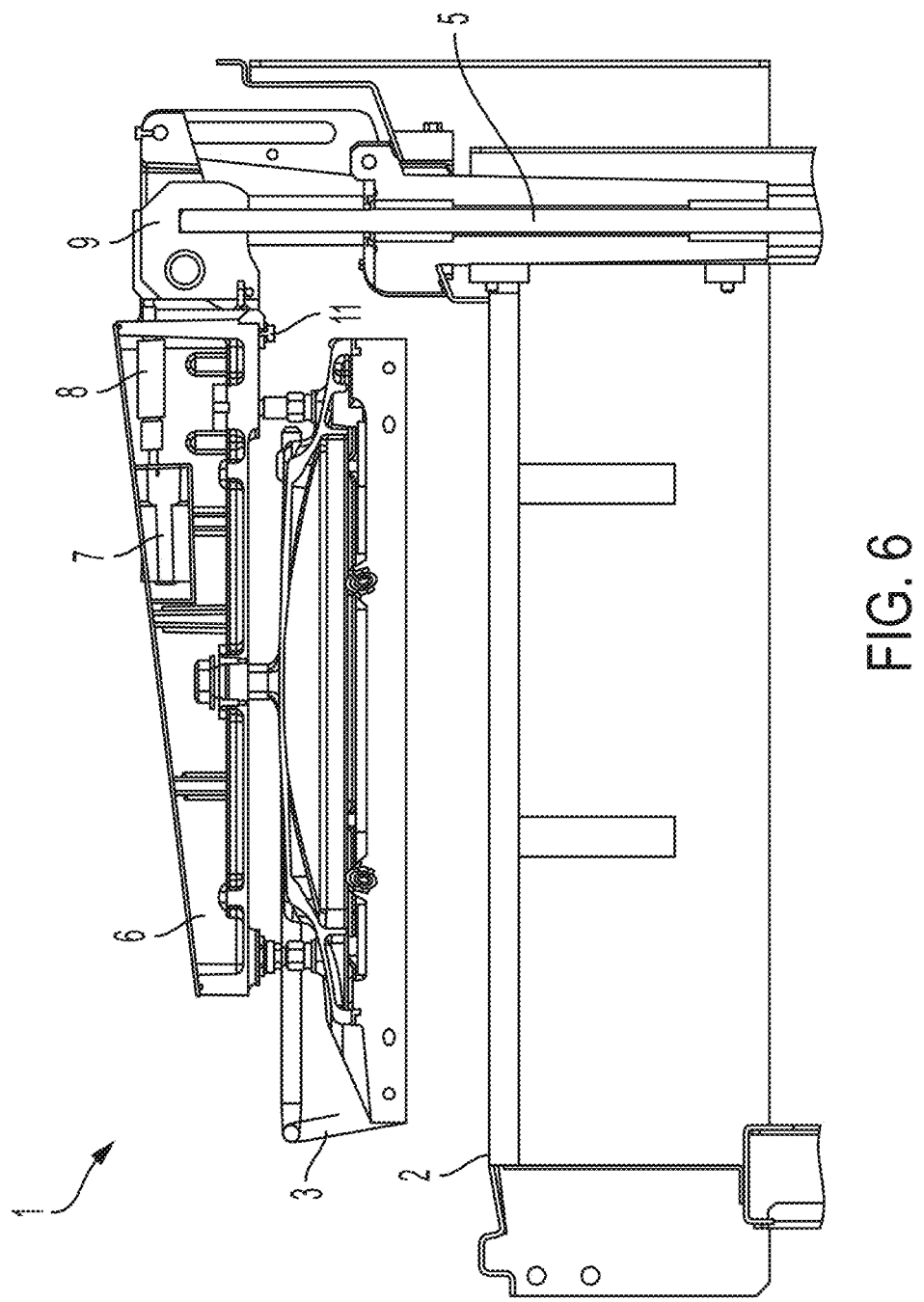
FIG. 6 is a second cross-sectional detail of the grill of FIG. 1, with an upper platen in a raised position.
Figure 7:
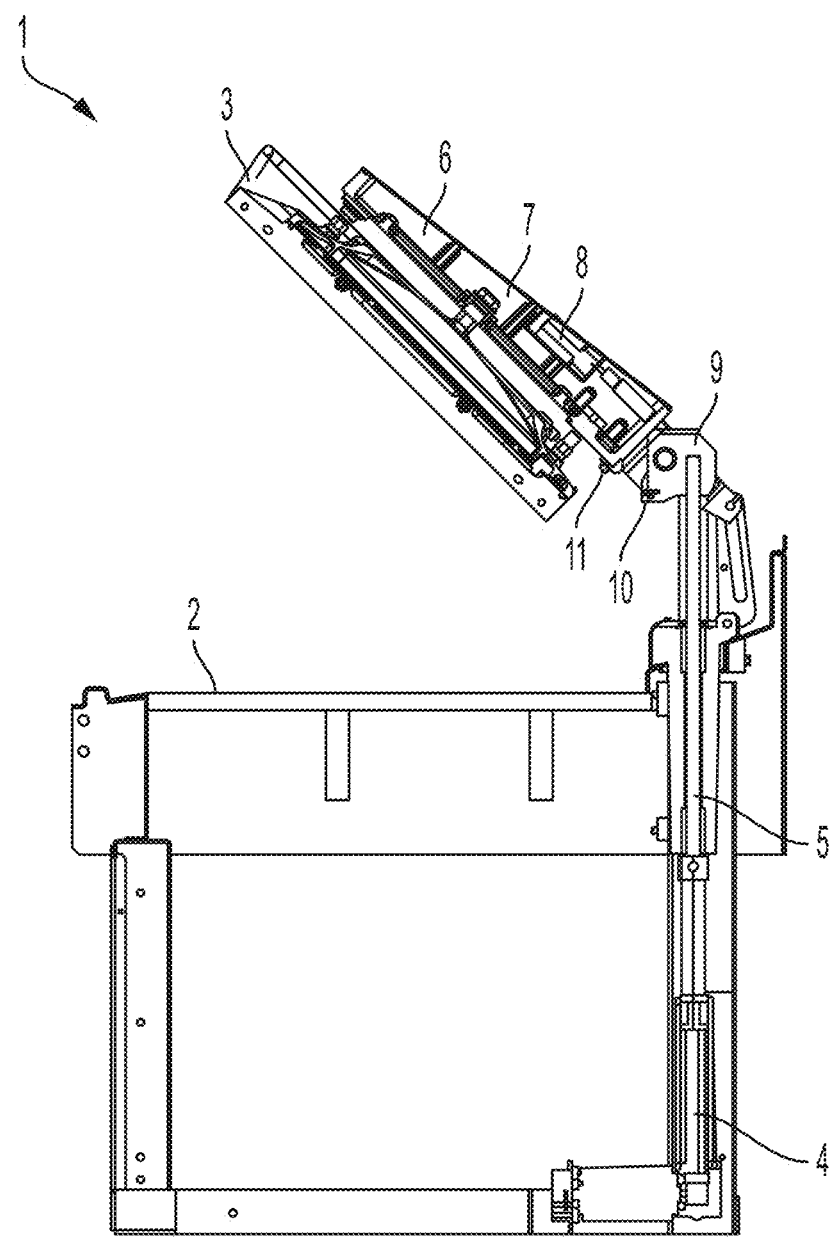
FIG. 7 is a side view of the grill of FIG. 1, with an upper platen in a raised position.
Figure 8:
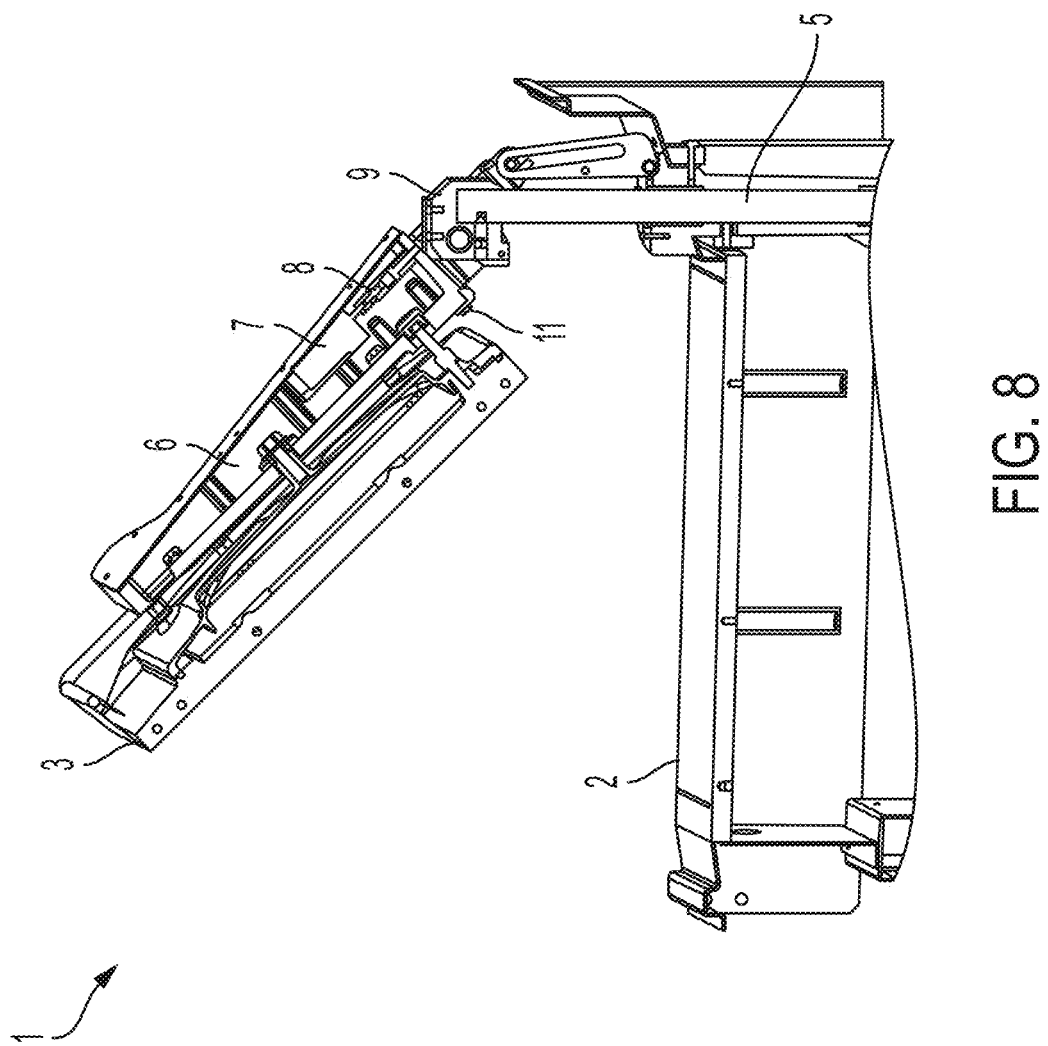
FIG. 8 is a third cross-sectional view of the grill of FIG. 1, with the upper platen in a raised and tilted position.
Figure 10:
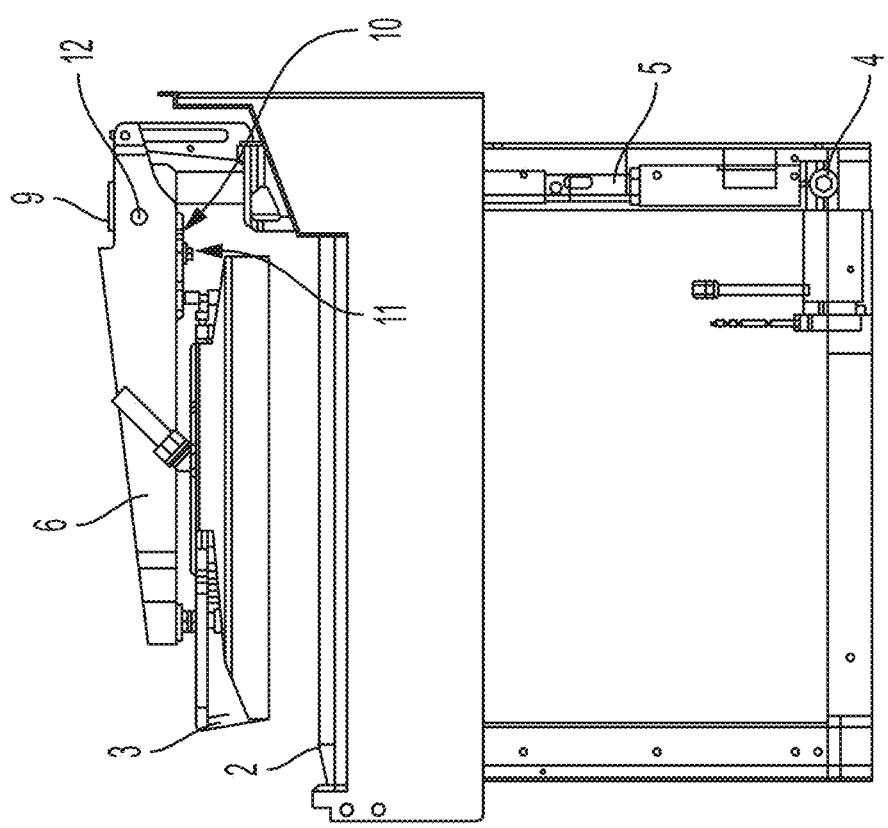
FIG. 10 is a side view of the grill of FIG. 1, with the upper platen in a raised position.
Figure 11:
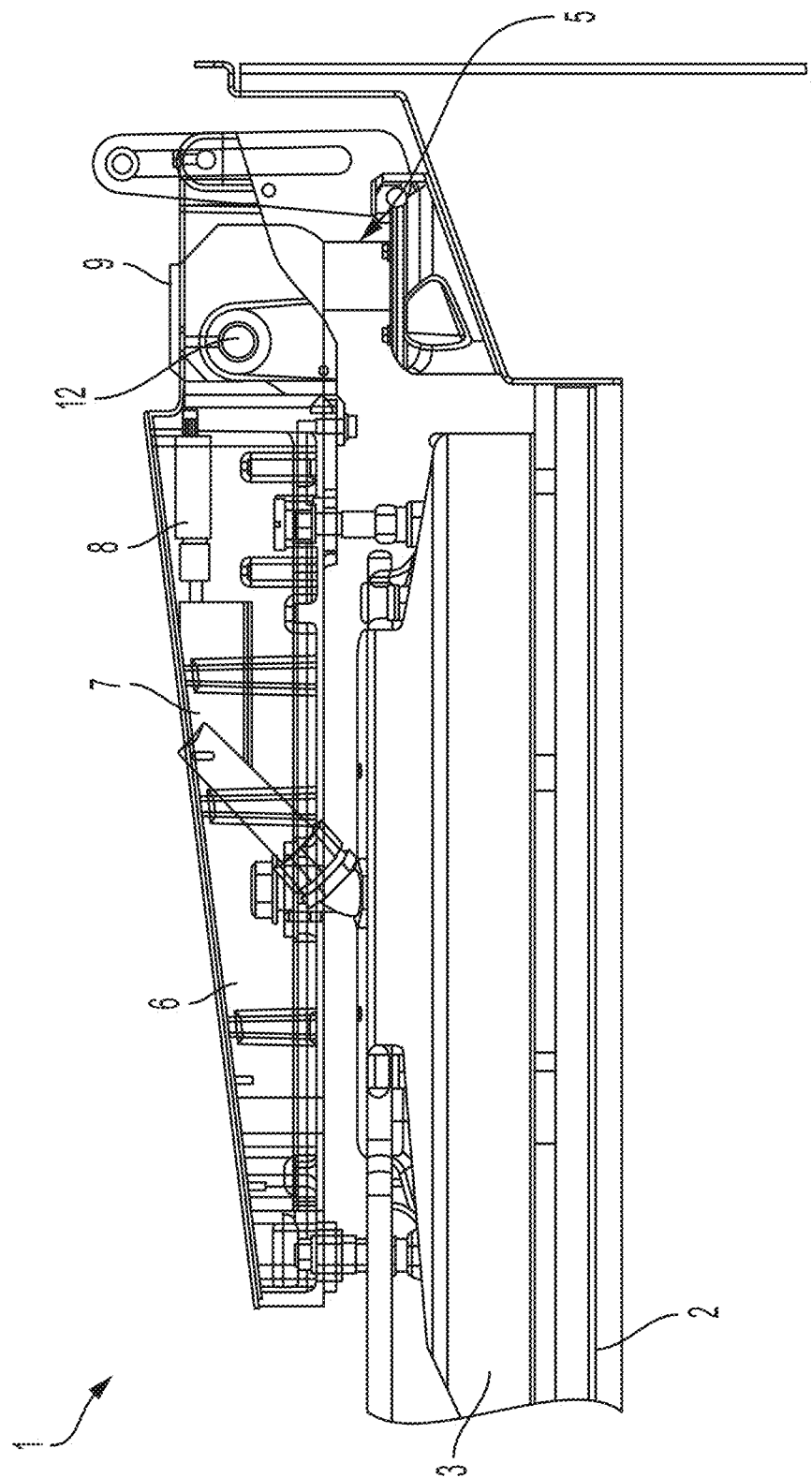
FIG. 11 is a transparent and detailed side view of the grill of FIG. 1, with the upper platen in an unlocked position.
Figure 12:
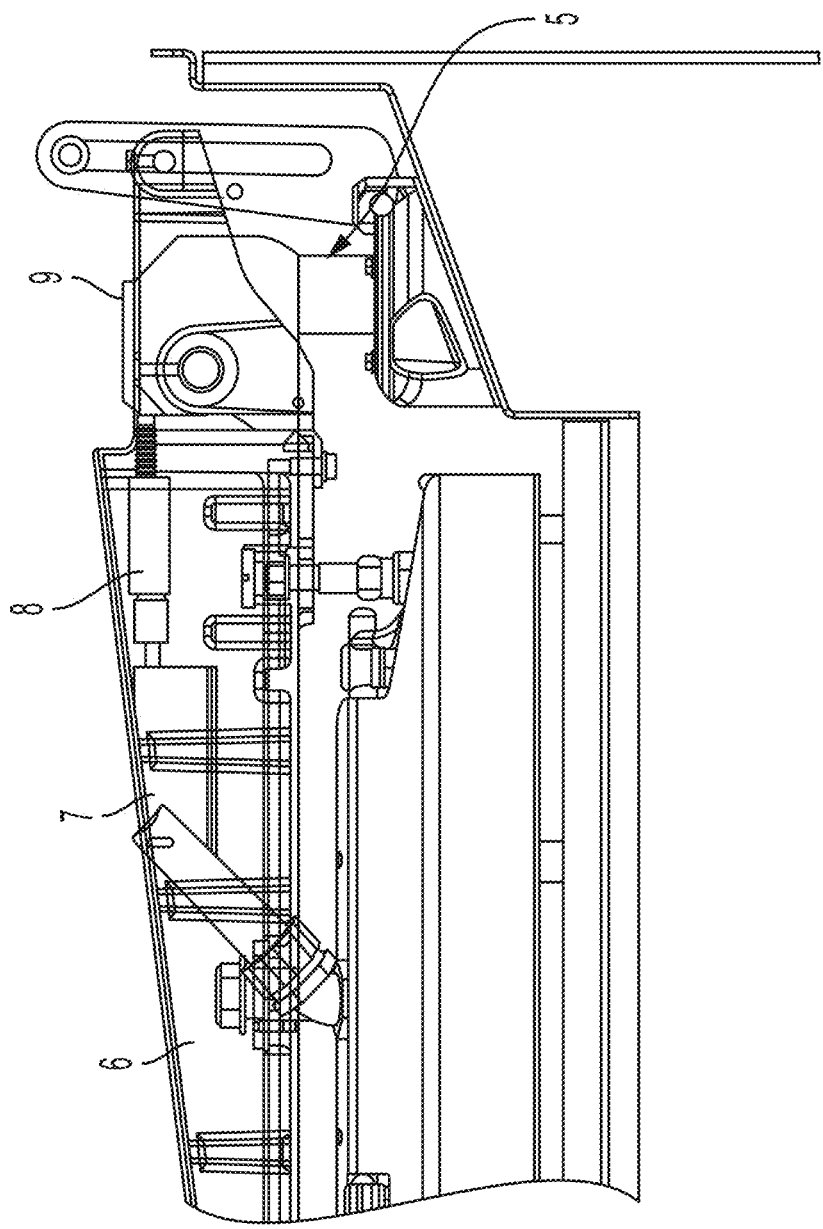
FIG. 12 is a transparent and detailed side view of the grill of FIG. 1, with the upper platen in a locked position.

Referring to FIG. 3, grill 1 can also have a linkage slot 15 with an internal slot that accepts a rod 16 mounted at the rear of the upper platen arm 6. When the platen is horizontal, the rod 16 travels within the slot. When actuator 4 extends upward to the point where rod 16 contacts the upper radius of the linkage slot 15, platen arm 6 and upper platen 3 rotate about pivot 12. As actuator 4 continues to extend, upper platen arm 6 and upper platen 3 rotate to their uppermost non-cooking position. Grill 1 may also have two or more of shafts 5 that are connected to actuator 4, each of which would function in the same manner described above to adjust the vertical height of upper platen 3. Grill 1 may also have two drive shaft heads 9. Multiple drive shaft heads 9 could each be connected to their own shafts 5. Grill 1 can also comprise multiple locking drives 7 and locking pins 8, one for each drive shaft head 9.

Figure 20:
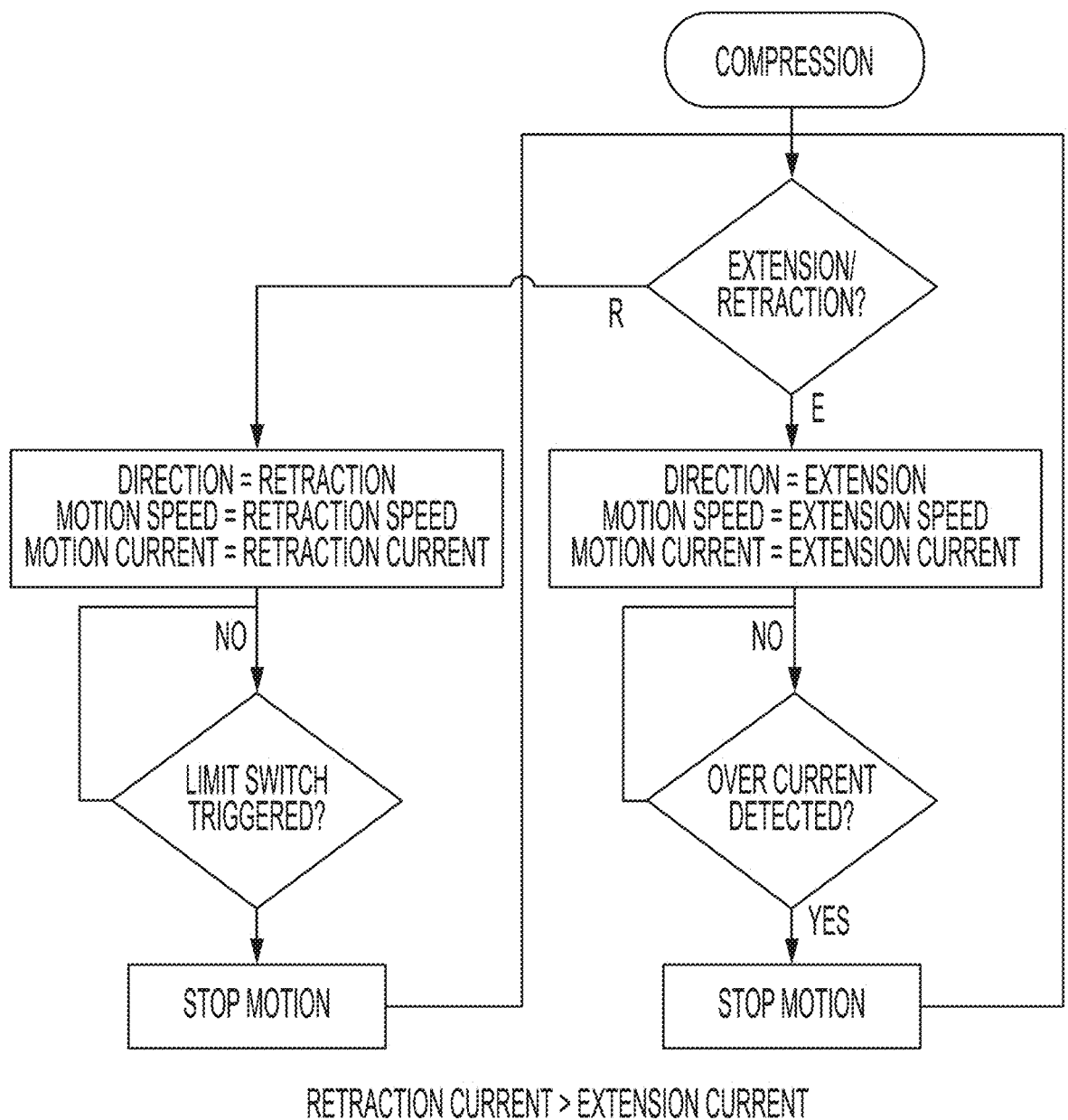
FIG. 20 shows a flow diagram illustrating the process for the control mechanism of FIG. 19.

Referring to FIGS. 19*a*, 19*b*, and 20, a control mechanism and process for the extension and retraction of locking pin 8 is shown. As previously discussed, locking drive 7 extends and retracts locking pin 8 so that it contacts drive shaft head 9. There are several ways for grill 1 of the present disclosure to determine when the extension or retraction of locking pin 8 is complete, and the next action can take place. Namely, the extension and retraction of pin 8 can be detected with mechanical devices, by detecting the amount of current consumed by locking drive 7, or a combination of each.

As seen in FIG. 19*a*, when drive 7 extends pin 8, drive 7 will use a certain amount of current. When pin 8 contacts head 9, the current draw of drive 7 will increase, since it cannot extend pin 8 any further. Controller 13 can detect this current draw spike, and determine that pin 8 is in its fully extended position. Pin 8 can have a protrusion or edge 8*a* thereon, and a switch 17 can be in the vicinity of pin 8. When drive 7 retracts pin 8, protrusion 8*a* hits switch 17, which is also in communication with and can send a signal to controller 13 to signify that pin 8 is retracted. FIG. 19*b* shows these steps as a flow diagram.

The present disclosure also contemplates that two of switches 17 can be used, one to detect full retraction, another to detect full extension of pin 8. One advantage of using the current control is that after repeated hits between pin 8 and shaft 9, the geometry of each may change. The location of a switch 17 may then have to be adjusted. Using the current control to determine when pin 8 is fully extended with respect to shaft 9 is not dependent on geometry. The signal indicating full extension is only given when pin 8 has tightly contacted head 9. With switch 17, additional control logic can be built into controller 13. For example, controller 13 can determine that upper platen 3 is lifting, but there has not yet been an indication from switch 17 that pin 8 has retracted. Controller 13 can then send an alarm signal out, and shut down the grill.

While the present disclosure has been described with reference to one or more particular embodiments, it will be understood by those skilled in the art that various changes may be made and equivalents may be substituted for elements thereof without departing from the scope thereof. In addition, many modifications may be made to adapt a particular situation or material to the teachings of the disclosure without departing from the scope thereof. Therefore, it is intended that the disclosure not be limited to the particular embodiment(s) disclosed as the best mode contemplated for carrying out this disclosure.

What is claimed is:

1. A grill for cooking food products, comprising:
   an upper platen having a positioning stop;
   a lower platen, wherein the food products are placed on the lower platen;
   a drive shaft having a drive shaft head with a pivot stop, wherein the drive shaft and drive shaft head are operably connected to the upper platen;
   an actuator operably connected to the drive shaft and comprising a motor, wherein the actuator selectively retracts and extends the drive shaft, in order to control a vertical height of the upper platen with respect to the lower platen; and
   a locking mechanism operably connected to the upper platen, wherein the locking mechanism locks the upper platen in a horizontal position while said positioning stop contacts said pivot stop that is parallel to the lower platen, wherein, when the locking mechanism locks the upper platen in the horizontal position, the motor drives the actuator to apply a downward force to the drive shaft and upper platen that is greater than the weight of the upper platen.

2. The grill of claim 1, wherein the locking mechanism comprises:
   a drive mechanism connected to the upper platen; and
   a locking pin operably connected to the drive mechanism, wherein the drive mechanism selectively extends and retracts the locking pin, and wherein in an extended position, the locking pin contacts the drive shaft head to lock the upper platen in the horizontal position.

3. The grill of claim 2, wherein the locking pin contacts the drive shaft head in order to prevent rotation of the upper platen with respect to the drive shaft head when the upper platen is in a horizontal position.

4. The grill of claim 2, further comprising a platen arm connected to a top of the upper platen and the drive shaft head, wherein the drive mechanism and the locking pin are connected to the platen arm.

5. The grill of claim 4, wherein the platen arm is rotatably connected to the drive shaft head at a pivot point, so that the platen arm and the upper platen rotate with respect to the drive shaft head about the pivot point.

6. The grill of claim 5, wherein a point at which the locking pin contacts the drive shaft head when in the extended position is above the pivot point.

7. The grill of claim 3, wherein the platen arm has a first pivot stop on an underside thereof, and the drive shaft has a second pivot stop thereon, so that when the upper platen is in a horizontal position, the first pivot stop contacts the second pivot stop.

8. The grill of claim 2, further comprising:
a housing;
a controller within the housing, wherein the controller is in communication with the actuator and the drive mechanism; and
a user interface on a surface of the housing.

9. The grill of claim 8, further comprising a cooking program stored on the controller, wherein a user selects the program through the user interface, and the controller operates the actuator and the drive mechanism according to the cooking program.

10. The grill of claim 8, further comprising a switch in communication with the controller, so that when the drive mechanism fully retracts the locking pin, the locking pin contacts the switch, and the switch sends a signal to the controller.

11. The grill of claim 8, wherein the controller determines an amount of current used by the drive mechanism when the drive mechanism extends the locking pin, and the controller determines that the locking pin is fully extended when the current used by the drive mechanism spikes.

12. A method of cooking a food product with the grill of claim 1, comprising the steps of:
placing the food product on the lower platen;
controlling the actuator to lower the upper platen to a horizontal position that is parallel to the lower platen;
engaging the locking mechanism, so that the upper platen is locked in the horizontal position;
controlling the actuator to move the upper platen toward the lower platen, when the upper platen is in the horizontal position; and
controlling the actuator to apply a downward force on the upper platen and the food product that is greater than the weight of the upper platen.

13. A method of deforming a food product with the grill of claim 1, comprising the steps of:
placing the food product on the lower platen;
controlling the actuator to lower the upper platen to a horizontal position that is parallel to the lower platen;
engaging the locking mechanism, so that the upper platen is locked in the horizontal position;
controlling the actuator to move the upper platen toward the lower platen, while the upper platen is in the horizontal position, thereby compressing the food product;
controlling the actuator to apply a downward force on the upper platen and the food product that is greater than the weight of the upper platen, thereby compressing the food product so that a thickness of the product after the compressing step is smaller than a thickness of the food product before the compressing step; and
cooking the food product between the lower platen and the upper platen.

14. The method of claim 13, further comprising the step of, during the cooking step, changing a height of the upper platen with respect to the lower platen.

15. The grill of claim 2, wherein the locking pin travels in a horizontal direction.

16. The method of claim 12, wherein the grill further comprises a controller, wherein the controller has a cooking program stored thereon, wherein the cooking program includes cooking parameters relating to a height of the upper platen with respect to the lower platen, an amount of time the locking mechanism is engaged, or an amount of pressure applied to the upper platen, and
wherein the controlling and engaging steps are performed according to the cooking program.

17. The method of claim 13, wherein the grill further comprises a controller, wherein the controller has a cooking program stored thereon, wherein the cooking program includes cooking parameters relating to a height of the upper platen with respect to the lower platen, an amount of time the locking mechanism is engaged, or an amount of pressure applied to the upper platen, and
wherein the controlling and engaging steps are performed according to the cooking program.

* * * * *